UNITED STATES PATENT OFFICE.

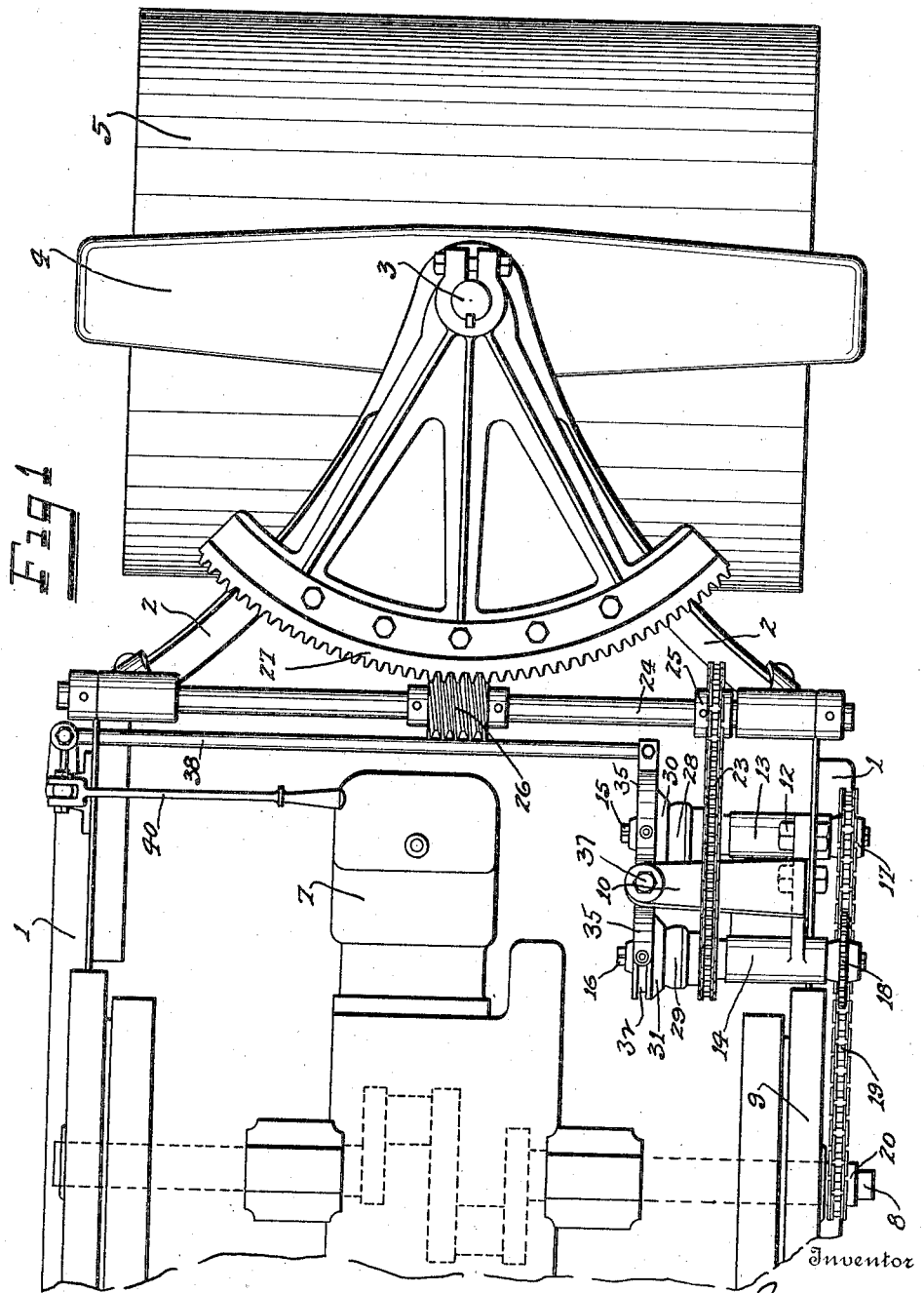

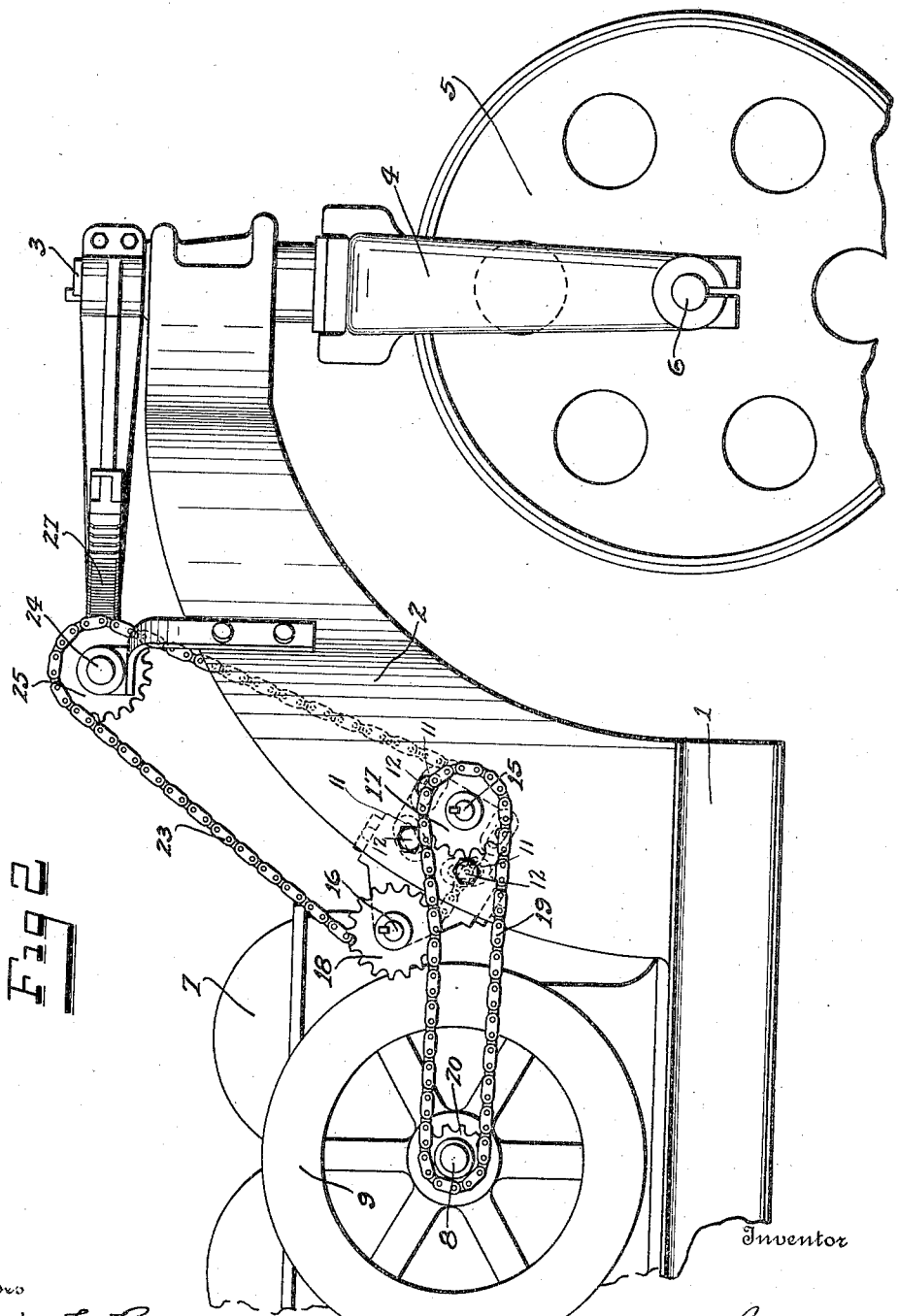

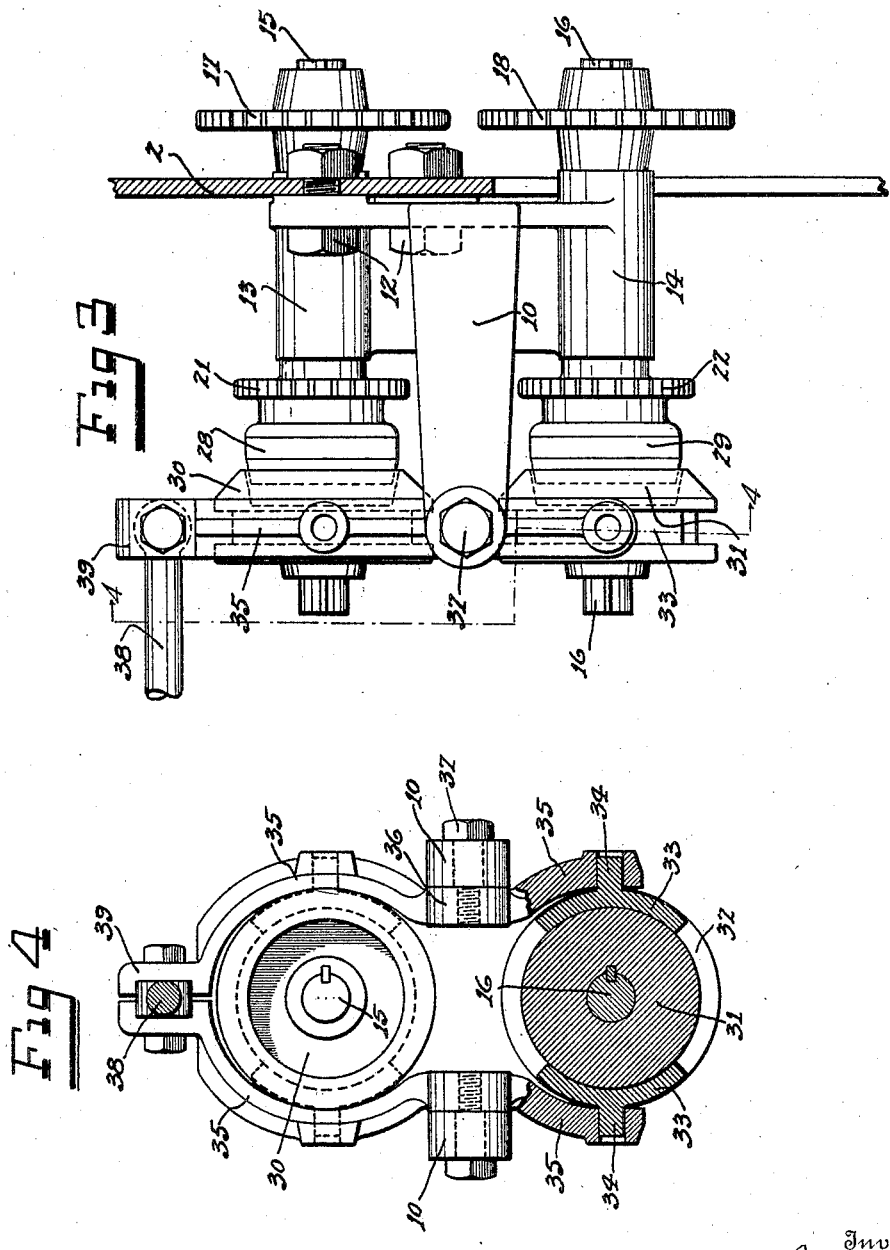

HENRY D. JONES, OF SPRINGFIELD, OHIO, ASSIGNOR TO THE KELLY-SPRINGFIELD ROAD ROLLER COMPANY, OF SPRINGFIELD, OHIO, A CORPORATION OF OHIO.

STEERING MECHANISM FOR ROAD-ENGINES.

1,179,932. Specification of Letters Patent. Patented Apr. 18, 1916.

Application filed August 25, 1915. Serial No. 47,359.

*To all whom it may concern:*

Be it known that I, HENRY D. JONES, a citizen of the United States, residing at Springfield, in the county of Clark and State of Ohio, have invented certain new and useful Improvements in Steering Mechanism for Road-Engines, of which the following is a specification.

This invention relates to steering mechanism for road engines, the devices being more particularly adapted for engines of the road roller type.

The object of the invention is to simplify and make more effective the operation of the steering mechanism heretofore employed in machines of this character.

In the accompanying drawings:—Figure 1 is a top plan view of so much of the forward part of a road roller as is necessary to illustrate my improvements, the improved steering mechanism being shown applied thereto. Fig. 2 is a side elevation of the same. Fig. 3 is a top plan of a portion of the steering devices showing the support for the same in section. Fig. 4 is a section on the line 4—4 of Fig. 3.

In said drawings 1 represents a portion of the forward part of the frame of the machine to which my improvements are applied provided with the usual upwardly and forwardly extending V-shaped head 2, in the forward end of which is swivelly mounted the upwardly-extending spindle 3 of the yoke 4 which straddles the forward roller 5 and is journaled upon the axle 6 thereof in a manner well known in machines of this character. The motive power in the present machine is an internal combustion engine 7, 8 representing the crank shaft and 9 the fly wheel thereof; this engine serving to propel the machine in the manner explained in my pending application Ser. No. 40,229, filed July 16th, 1915. Power is also taken from the crank shaft of the engine to effect the steering of the machine in the following manner:

Adjustably secured to the portion 2 of the frame is a bracket 10, the part 2 being provided with a series of radially arranged slotted openings 11 (shown in dotted lines in Fig. 2) through which the bolts 12 which secure the bracket 10 to the frame portion 2 pass so that said bracket may be adjusted relatively to the portion 2 for the purpose hereinafter explained. Mounted in bearings 13 and 14 on opposite sides of the center of the bracket are shafts 15 and 16 which extend on the outside of the frame portion 2 and are there provided with sprocket wheels 17 and 18. A chain 19 transmits motion to these sprocket wheels from the crank shaft through the medium of a sprocket wheel 20 on the outer end of said shaft, said chain passing about the sprocket wheel 17 so as to rotate the same in the same direction as that of the sprocket wheel 20 and having the teeth of the sprocket wheel 18 in mesh with the outer side of the chain so as to transmit motion thereto in the opposite direction. Loosely mounted on the respective shafts 15 and 16 are sprocket wheels 21 and 22 about which passes a chain 23 for the purpose of transmitting motion to a shaft 24 through the medium of the sprocket wheel 25 thereon about which said chain 23 passes. The shaft 24 has a centrally arranged worm 26 in mesh with the teeth of a segmental rack 27, the hub of which is clamped and splined to the vertically arranged spindle 3.

Connected with the respective sprocket wheels 21 and 22 are friction clutch members 28 and 29 and slidably mounted upon the respective shafts 15 and 16 but splined thereto are friction clutch members 30 and 31 so arranged that when one is shifted into driving relation with its corresponding clutch member the other will be thrown out of driving relation with its corresponding clutch member so that the sprocket wheels 21 and 22 may be alternately thrown into and out of driving relation with the shafts 15 and 16, this operation being accomplished in the following manner: Located in a groove 32 in each of the clutch members 30 and 31 is a pair of segmental rings 33 having trunnions 34 journaled in the oppositely extending yoke shaped members 35 of an operating device, the central portion 36 of which is pivotally connected by the pivot screws 37 with the inner bifurcated end of the bracket 10. An operating rod 38 pivotally secured to projecting ears 39 on one pair of arms 35 and having its other end operatively connected with a lever 40 located at a suitable point on the machine forms the means for rocking the yoke shaped arms 35 about their pivotal center, and through the medium of the segmental rings 33, shifting the clutch members 30 and 31 into and out of driving relation with the corresponding clutch members 28 and 29. When the clutch members 30 and 28 are in engagement the sprocket wheel 21 will be in driving relation with the shaft 15 so as to rotate the shaft 24 in one direction, while, when the clutch members 31 and 29 are in engagement, the sprocket wheel 22 will be in driving relation with the shaft 16 so as to operate the shaft 24 in the opposite direction. When either one of the sprocket wheels 21 and 22 is in driving relation with its shaft, the other sprocket wheel will rotate freely on its shaft, while when the operating yoke members 35 are in a neutral position, as indicated at Fig. 3, both of the sprocket wheels 21 and 22 are at rest.

For the purpose of adjusting the chains, the bolts 12 may be loosened and the bracket moved relatively to the supporting part 2 which changes the centers of the respective sprockets 17 and 18 to tighten and loosen the chain 19, and also simultaneously changes the centers of the sprockets 21 and 22 so as to simultaneously adjust the chain 23.

Having thus described my invention, I claim:

1. In a steering mechanism for road engines, a swiveled steering member, a segmental rack connected therewith, a driven shaft, a worm on said shaft in mesh with the teeth of said segment, a sprocket wheel on said shaft, a main drive shaft, two intermediate shafts, sprocket wheels on said intermediate shafts, a chain driven from said driving shaft and transmitting motion in opposite directions to said intermediate shaft sprockets, and means for alternately transmitting motion from said intermediate shafts to said driven shaft.

2. In a steering mechanism for road engines, a swiveled steering member, a driven shaft having an operative connection with said steering member, a main drive shaft, two intermediate shafts, sprocket wheels on said intermediate shafts, a sprocket wheel on said driving shaft, a chain arranged for transmitting motion in opposite directions from said drive shaft sprocket wheel to the sprocket wheels on said intermediate shafts, and means for transmitting motion alternately from said intermediate shafts to said driven shaft.

3. In a steering mechanism for road engines, a swiveled steering member, a driven shaft having an operative connection with said steering member, a drive shaft, a sprocket wheel on said drive shaft, two intermediate shafts, sprocket wheels on said intermediate shafts, a chain arranged to transmit motion from said drive shaft sprocket wheels in opposite direction to the wheels on said intermediate shafts, each of said intermediate shafts having a second sprocket wheel, a sprocket wheel on said driven shaft, and a chain for transmitting motion thereto from the second sprocket wheels of said intermediate shafts, and means for alternately connecting and disconnecting said second sprocket wheels with their respective shafts.

4. In a steering mechanism for road engines, a swiveled steering member, a driven shaft having an operative connection with said steering member, a sprocket wheel on said shaft, two intermediate shafts, means for transmitting motion in opposite directions to said shafts, a sprocket wheel loosely mounted upon each of the said intermediate shafts, a chain for transmitting motion from said sprocket wheels to the sprocket wheel on said driven shaft, a clutch member connected with each sprocket wheel on the intermediate shafts, a shiftable clutch member on each intermediate shaft, and means for throwing said shiftable clutch members alternately into and out of operative relation with their corresponding members on said sprocket wheels.

5. In a steering mechanism for road engines, a steering member, a drive shaft, a sprocket wheel on said drive shaft, two intermediate shafts, a sprocket wheel upon each of said intermediate shafts, a chain for transmitting motion in opposite directions from the sprocket wheel on said drive shaft to the sprocket wheels on said intermediate shafts, means for adjusting said intermediate shafts and sprocket wheels for adjusting the tension of said chain, and means for transmitting motion alternately from the said intermediate shafts to said steering member.

6. In a steering mechanism for road engines, a steering member, a drive shaft, a sprocket wheel on said drive shaft, two intermediate shafts, a sprocket wheel on each intermediate shaft, a chain for transmitting motion from the said drive shaft sprocket to the wheels on said intermediate shafts, the sprocket wheel on one of said intermediate shafts being inside said chain and the other on the outside thereof so that motion is imparted in opposite directions thereto, a second sprocket wheel upon each of said intermediate shafts, a driven shaft operatively connected with said steering member, a sprocket wheel on said driven shaft, and a chain for transmitting motion to said sprocket wheel from each of the second mentioned sprocket wheels on said intermediate shafts, means for placing said second mentioned sprockets alternately in driving relation with said intermediate shafts, and means for adjusting the position of said intermediate shafts for the purpose of adjusting the tension of said chains.

In testimony whereof, I have hereunto set my hand this 17th day of August, 1915.

HENRY D. JONES.

Witness:
CHAS. I. WELCH.

Copies of this patent may be obtained for five cents each, by addressing the "Commissioner of Patents, Washington, D. C."